(12) United States Patent
Pahde et al.

(10) Patent No.: US 10,990,848 B1
(45) Date of Patent: Apr. 27, 2021

(54) SELF-PACED ADVERSARIAL TRAINING FOR MULTIMODAL AND 3D MODEL FEW-SHOT LEARNING

(71) Applicant: SAP SE, Walldorf (DE)

(72) Inventors: Frederik Pahde, Berlin (DE); Oleksiy Ostapenko, Berlin (DE); Tassilo Klein, Berlin (DE); Moin Nabi, Berlin (DE); Mihai Puscas, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/728,412

(22) Filed: Dec. 27, 2019

(51) Int. Cl.
| | | |
|---|---|---|
| *G06N 3/08* | (2006.01) | |
| *G06T 19/20* | (2011.01) | |
| *G06K 9/62* | (2006.01) | |
| *G06F 16/53* | (2019.01) | |
| *G06N 3/04* | (2006.01) | |
| *G06T 15/04* | (2011.01) | |
| *G06T 17/20* | (2006.01) | |

(52) U.S. Cl.
CPC .......... *G06K 9/6256* (2013.01); *G06F 16/53* (2019.01); *G06K 9/6215* (2013.01); *G06N 3/0454* (2013.01); *G06N 3/08* (2013.01); *G06T 15/04* (2013.01); *G06T 17/20* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| | | |
|---|---|---|
| 6,466,695 B1 | 10/2002 | Potzsch |
| 10,445,565 B2 | 10/2019 | Tu |
| 2005/0047647 A1 | 3/2005 | Rutishauser |
| 2018/0341862 A1 | 11/2018 | Ehrman |
| 2019/0012526 A1 | 1/2019 | Guo |
| 2019/0026600 A1 | 1/2019 | Bagherinezhad |

(Continued)

OTHER PUBLICATIONS

Pahde F, Nabi M, Klein T, Jahnichen P. Discriminative hallucination for multi-modal few-shot learning. In2018 25th IEEE International Conference on Image Processing (ICIP) Oct. 7, 2018 (pp. 156-160). IEEE.*

(Continued)

*Primary Examiner* — Zhengxi Liu
(74) *Attorney, Agent, or Firm* — Mintz, Levin, Cohn, Ferris, Glovsky and Popeo, P.C; Pedro Suarez; Paul Brockland

(57) ABSTRACT

A method for generating synthetic data is provided. The method includes retrieving, from a database, a set of authentic base class images. The method further includes generating a three dimensional mesh of a base class. The method further includes retrieving, from the database, a set of textual descriptions. The method further includes retrieving a set of authentic novel class images. The method further includes generating, at a first neural network, a set of synthetic novel class images, the generating based on at least the three dimensional mesh, the set of textual descriptions, and/or the set of authentic novel class images. The method further includes training, based on at least the set of synthetic novel class images, a second neural network, the second neural network ranking the set of synthetic novel class images and outputting a set of highest ranked synthetic images from the set of synthetic novel class images.

20 Claims, 10 Drawing Sheets

(56) References Cited

U.S. PATENT DOCUMENTS

| | | |
|---|---|---|
| 2019/0080453 A1 | 3/2019 | Song |
| 2019/0147334 A1 | 5/2019 | Lisowska |
| 2019/0251952 A1 | 8/2019 | Arik |
| 2019/0258953 A1 | 8/2019 | Lang |
| 2019/0311814 A1 | 10/2019 | Kannan |
| 2019/0325183 A1 | 10/2019 | Tscherepanow |
| 2019/0382941 A1 | 12/2019 | Hwang |

OTHER PUBLICATIONS

Liu Y, Lee J, Park M, Kim S, Yang E, Hwang SJ, Yang Y. Learning to propagate labels: Transductive propagation network for few-shot learning. arXiv preprint arXiv:1805.10002. May 25, 2018.*

Pahde F, Jähnichen P, Klein T, Nabi M. Cross-modal hallucination for few-shot fine-grained recognition. arXiv preprint arXiv: 1806.05147. Jun. 13, 2018.*

Hariharan B, Girshick R. Low-shot visual recognition by shrinking and hallucinating features. InProceedings of the IEEE International Conference on Computer Vision 2017 (pp. 3018-3027).*

Kanazawa A, Tulsiani S, Efros AA, Malik J. Learning category-specific mesh reconstruction from image collections. InProceedings of the European Conference on Computer Vision (ECCV) 2018 (pp. 371-386).*

Pahde F, Puscas M, Wolff J, Klein T, Sebe N, Nabi M. Low-shot learning from imaginary 3d model. In2019 IEEE Winter Conference on Applications of Computer Vision (WACV) Jan. 7, 2019 (pp. 978-985). IEEE.*

Beery, Sara, et al. "Synthetic examples improve generalization for rare classes." Proceedings of the IEEE/CVF Winter Conference on Applications of Computer Vision. 2020.*

Lu, Jiang, et al. "Learning from Very Few Samples: A Survey." arXiv preprint arXiv:2009.02653 (2020).*

Pahde, et al., Self paced adversarial training for multimodal few-shot learning, 10 pages. Retrieved from: https://arxiv.org/pdf/1811.09192.pdf, Published on Jan. 7, 2019.

* cited by examiner

SELF-PACED ADVERSARIAL TRAINING FOR MULTIMODAL AND 3D MODEL FEW-SHOT LEARNING

TECHNICAL FIELD

The subject matter described herein relates generally to machine learning and more specifically to few-shot learning by a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include an image or a textual description of the error associated with the ticket. As such, in order to determine a suitable response for addressing the error associated with the ticket, the enterprise resource planning system may include a machine learning model trained to perform text or image classification. For instance, the machine learning model may be trained to determine, based at least on the textual description of the error, a priority for the ticket corresponding to a severity of the error.

SUMMARY

Systems, methods, and articles of manufacture, including computer program products, are provided for few-shot learning by machine learning processing. In one aspect, there is provided a system including at least one data processor and at least one memory. The at least one memory may store instructions that cause operations when executed by the at least one data processor. The operations may include retrieving, from a database, a set of authentic base class images. The operations may further include generating, based on at least the set of authentic base class images, a three dimensional mesh of a base class. The operations may further include retrieving, from the database, a set of textual descriptions of one or more objects. The one or more objects may include a novel class object. The operations may further include retrieving a set of authentic novel class images. The operations may further include generating, at a first neural network, a set of synthetic novel class images. The generating may be based on at least the three dimensional mesh, the set of textual descriptions, and/or the set of authentic novel class images. The operations may further include training, based on at least the set of synthetic novel class images, a second neural network. The second neural network may rank the set of synthetic novel class images and may output a set of highest ranked synthetic images from the set of synthetic novel class images. Training the second neural network may further include updating the second neural network based on the highest ranked images from the set of synthetic novel class images.

In some variations, one or more features disclosed herein including the following features can optionally be included in any feasible combination. Generating the set of synthetic novel class images may be based on at least a pose of a first base class image of the set of authentic base class images, a viewpoint of the first base class image of the set of authentic base class images, a pose of a second base class image described in the set of textual descriptions, and/or a viewpoint of the second base class image described in the set of textual descriptions. Training the second neural network may include training the second neural network to detect an object within the set of synthetic novel class images or the set of authentic novel class images. Training the second neural network may further include updating the second neural network based on at least a loss distribution. The loss distribution may indicate whether the object is located within the set of synthetic novel class images or the set of authentic novel class images. The operations may further include generating, at a third neural network, a second set of synthetic novel class images, the third neural network generated based on at least the set of synthetic novel class images and the set of textual descriptions. Training the second neural network may be further based on at least the second set of synthetic novel class images. The second neural network may be configured to rank the second set of synthetic novel class images and to output a set of highest ranked synthetic images from the second set of synthetic novel class images. Training the second neural network may further include updating the second neural network based on at least a loss distribution. The loss distribution may indicate whether the set of highest ranked synthetic images are classified as authentic or synthetic. The operations may further include adding the set of highest ranked images to the set of authentic novel class images. Generating the set of synthetic novel class images may be further based on at least the set of highest ranked synthetic images. The operations may further include training the first neural network based on at least the set of highest ranked images. Training the second neural network may further include updating the second neural network based on at least a loss distribution. The loss distribution may indicate whether the synthetic novel class images are classified as authentic or synthetic. The base class images may include a set of images including a plurality of samples. The novel class images may include a set of images having fewer samples than the base class images. Generating the set of synthetic novel class images may include altering the three dimensional mesh based on at least an authentic novel class image of the set of authentic novel class images. Altering the three dimensional mesh may include rotating the three dimensional mesh to capture one or more viewpoints of the authentic novel class image. Altering the three dimensional mesh may include adding a texture of the authentic novel class image to the three dimensional mesh. Ranking the set of synthetic novel class images may include scoring the set of synthetic novel class images per category based on at least a similarity to the set of authentic novel class images. Outputting the set of highest ranked synthetic images may include outputting an image with the highest score per category.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to preparing data for machine learning processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
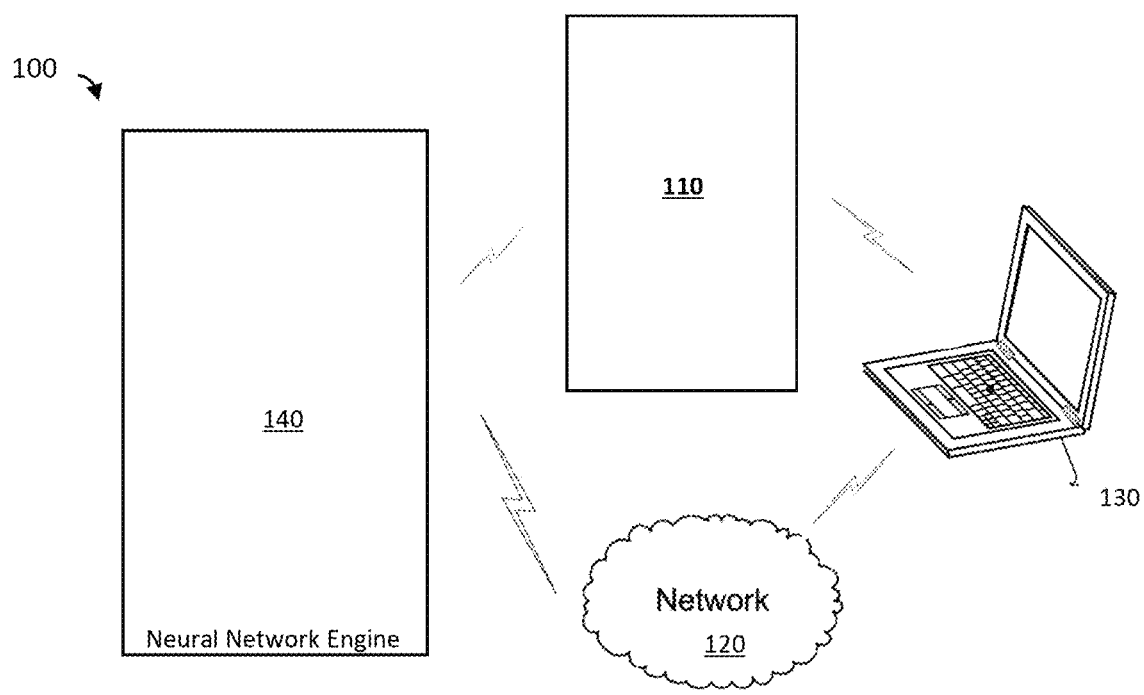
FIG. 1 depicts a system diagram illustrating a data processing system, in accordance with some example embodiments.

Accessing big data may be implemented for conventional deep learning applications but may also be a limiting factor. In many applications processing big data may be too expensive (or impractical) to acquire a sufficient quantity of training samples, resulting in inferior model accuracy. In contrast, humans may be able to quickly learn from only few instances. In consequence, research in the domain of few-shot learning (e.g., learning and generalizing from only few training samples) has gained more and more interest. However, research has focused on utilizing only one data modality (mostly images) so far for few-shot learning. By including data from additional modalities (e.g., textual descriptions), it may be possible to overcome limitations in the low data regime, resulting in improved model performance. Incorporating multimodal data (e.g., images and fine-grained descriptions thereof) may force the model to identify highly discriminative features across modalities facilitating use in few-shot scenario. Specifically, pursuing multimodality suggests that novel classes with low training data in one modality can benefit from previously learned features (e.g., in a different modality).

In some aspects, it may be possible to extend few-shot learning to incorporate multimodality in a meta-learning fashion.

Specifically, in some implementations, few-shot learning may be multimodal during training (e.g., images and texts) and single-modal during testing time (e.g., images). This may come with an associated task to utilize multimodal data in base classes (e.g., with many samples) and to learn explicit visual classifiers for novel classes (e.g., with few samples). A base class may be a class, as in an object-oriented programming language, from which other classes are derived. For example, a base class may be generic bird species (e.g., flying birds) that have a large quantity of samples (e.g., a high quantity of images). A novel class may be derived from the base class such as a specific rare flying bird species that has only a few samples (e.g., a low quantity of images). This scenario for multimodal few-shot learning may mimic situations that often arise in practice. To alleviate the data shortage for novel classes, cross-modal data generation may be a viable solution. It may facilitate few-shot learning by, for example, generating synthetic images conditioned on fine-grained textual descriptions, and thus solving a scarce data problem (e.g., for novel classes). In this regard, generative adversarial networks (GANs) may be effective for cross-modal sample generation.

GANs are deep networks mainly applied for unsupervised tasks and commonly used to generate data (e.g., images). The supervisory information in a GAN may be indirectly provided within the frame of an adversarial game between two independent networks: a generator (G) and a discriminator (D). During training, G generates new data and D tries to understand whether its input is real (e.g., it is a training image) or if it was generated by G. This competition between G and D may be helpful in boosting the accuracy of both G and D. At testing time, only G is used to generate new data. Specifically, a text-conditioned GAN, described herein, may take as input a text and generate an image. Training the text-conditioned GAN may allow for the generation of a potentially infinite number of image samples given textual descriptions. However, a challenge is to pick adequate samples out of the pool of generated samples that allow for building a better classifier (e.g., a discriminator) within the few-shot scenario. Such subset of images should not only be realistic but also class discriminative (e.g., determine which class (e.g., authentic or synthetic) the input belongs to). To this end, a self-paced strategy may be implemented and used to select a subset of generated images corresponding to ones in which the generator is most confident about their "reality" and the discriminator is the most confident about their "class discriminativeness" (e.g., authentic or synthetic).

A main concept behind self-paced learning is that a subset of "easy" samples may be automatically selected in each iteration. Training may then be performed using only this subset, which may be progressively increased in the subsequent iterations when the model becomes more mature. Self-paced learning, applied in many other studies is related to curriculum learning, and is biologically inspired by the common human process of gradual learning, starting with the simplest concepts and increasing complexity. A self-paced learning approach may handle the uncertainty related to the quality of generated samples, thus "easy" may be interpreted as "high quality". Specifically, a subset of "high quality" samples generated by the generator G may automatically be selected by the discriminator D in each iteration, and training GAN may then performed using only this subset. Intuitively, the GAN may select a subset of the generated samples that the classifier (e.g., discriminator D) trained on the real data is most confident about.

The systems and methods regarding few shot learning described herein may extend the few shot learning setting to work with multimodal data (e.g., textual descriptions) during training time. A class-discriminative text-conditional GAN may facilitate few-shot learning by generating additional training images. A self-paced learning strategy may facilitate reliable cross-modal image generation by selecting the highest quality generated images for training. This approach may feature robustness and may help form the baseline in the challenging few-shot scenario.

In some aspects, it may be possible to implement a high quality generation stage by learning, based on samples from the base class, a 3D structure of the novel class. A curriculum-based discriminative sample selection method may further refine the generated data, which may promote learning more explicit visual classifiers.

Learning the 3D structure of the novel class may facilitate few-shot learning by allowing the few-shot learning system to generate synthetic images (e.g., data) of the novel class from different viewpoints of the same object. Simultaneously, learning the novel objects' texture map may allow for a controlled transfer of the novel objects' appearance to new poses seen in the base class samples. Freely generating synthetic images with respect to different poses and viewpoints of a single novel sample then in turn may allow a way to improve novel class data diversity. While reconstructing a 3D model from single images in a given category may exist, these methods lack easy applicability to a generating synthetic images setup and specifically miss any kind of texture and appearance reconstruction. The intuition behind the improved few-shot learning image generating performance is described herein.

FIG. 1 depicts a network diagram illustrating a network environment 100, in accordance with some example embodiments. Referring to FIG. 1, a training engine 110 may be communicatively coupled, via a wired and/or wireless network 120, to client device 130 and/or a neural network engine 140. The wired and/or wireless network 120 can be a wide area network (WAN), a local area network (LAN), and/or the Internet.

In some example embodiments, the neural network engine 140 may be configured to implement one or more machine learning models including, for example, a convolutional neural network. A convolutional neural network is a type of machine learning model that may be trained through supervised learning. For instance, training a convolutional neural network may include identifying errors that may be present in the classifications made by the convolutional neural network and subsequently minimizing these errors through repeated adjustments to the convolutional neural network. As such, the neural network engine 140 may be trained to serve as, for example, an image or data generator and/or a classifier/discriminator.

According to some example embodiments, the training engine 110 may be configured to generate a mixed training set that includes both synthetic images and non-synthetic images. The training engine 110 may be further configured to process the mixed training set with a neural network (e.g., implemented by the neural network engine 140) and to determine the performance of the neural network in classifying the images included the mixed training set. Although some of the samples refer to images, other types of data may be used as well.

According to some example embodiments, the training engine 110 may generate, based at least on the performance of the convolutional neural network, additional training data. The additional training data may include images with modifications that may cause the neural network to misclassify one or more synthetic data in the mixed training set.

In some example embodiments, the training engine 110 may generate synthetic data (e.g., synthetic images) based on non-synthetic data (e.g., authentic textual descriptions and/or authentic images) that are associated with one or more labels. For instance, the non-synthetic data may describe a three-dimensional scene that includes one or more objects (e.g., a bird or animal) within an environment (e.g., buildings, trees, streets, etc.). The non-synthetic data may be labeled with classifications that correspond to the objects depicted in these images. The labels associated with the non-synthetic data may correspond to the objects. To generate the synthetic data, the training engine 110 may apply, to the non-synthetic data, modifications to portions of the non-synthetic data. For example, the non-synthetic data may be modified by, for example, modifying the one or more objects and/or modifying the orientation (e.g., rotating) the one or more objects. The modifications to the non-synthetic image may also include altering the environment depicted in the non-synthetic image by at least applying, for instance, a different lighting and/or a different perspective (e.g., camera angle and/or position) to the non-synthetic image.

In some example embodiments, the client device 130 may provide a user interface for interacting with the training engine 110 and/or neural network engine 140. For example, a user may provide, via the client device 130, at least a portion of the non-synthetic data used to generate the mixed training set. The user may also provide, via the client device 130, one or more training sets, validation sets, and/or production sets for processing by the neural network engine 140. Alternately and/or additionally, the user may provide, via the client device 130, one or more configurations for the neural network engine 140 including, for example, conditional parameters (e.g., modifiers) such as demographic information, statistical information, or characteristics (e.g., race, age, genetic marker, disease, or the like) that may be used by the neural network engine 140 when processing one or more mixed training sets, validation sets, and/or production sets. The user may further receive, via the client device 130, outputs from the neural network engine 140 including, for example, classifications for the mixed training set, validation set, and/or production set.

In some example embodiments, the functionalities of the training engine 110 and/or the neural network engine 140 may be accessed (e.g., by the client device 130) as a remote service (e.g., a cloud application) via the network 120. For instance, the training engine 110 and/or the neural network engine 140 may be deployed at one or more separate remote platforms. Alternately and/or additionally, the training engine 110 and/or the neural network engine 140 may be deployed (e.g., at the client device 130) as computer software and/or dedicated circuitry (e.g., application specific integrated circuits (ASICs)).

Figure 2:
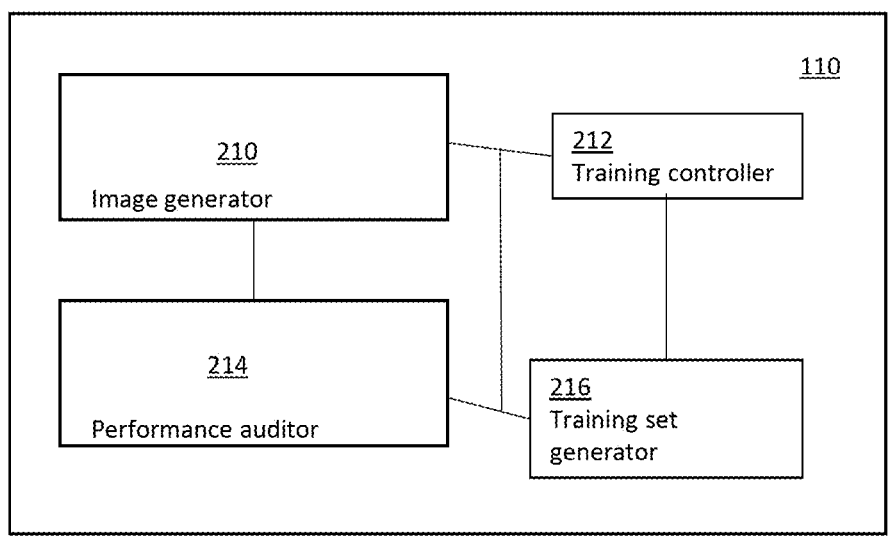
FIG. 2 is a block diagram of a training engine, in accordance with some example embodiments.

FIG. 2 depicts a block diagram illustrating the training engine 110, in accordance with some example embodiments. Referring to FIGS. 1-2, the training engine 110 may include an image generator 210, a training controller 212, a performance auditor 214, and a training set generator 216. It should be appreciated that the training engine 110 may include additional and/or different components.

As noted above, the training engine 110 may be configured to generate a mixed training set for training a neural network (e.g., implemented by the neural network engine 140). In some example embodiments, the synthetic image generator 210 may be configured to generate a plurality of synthetic images or data that may be included in a mixed training set used for training the neural network. The synthetic image generator 210 may generate one or more synthetic images or data by at least generating the synthetic images or data based on a textual description of an object (e.g., description of a novel class), a three dimensional (3D) mesh, and/or non-synthetic images or data.

In some example embodiments, the training controller 212 may conduct additional training of the neural network based at least on the performance of the neural network in processing a mixed training set (e.g., as determined by the performance auditor 214). The training controller 212 may train the neural network using additional training data that have been generated (e.g., by the synthetic image generator 210 and/or the training set generator 216) to include synthetic images that have been subject to modifications that the performance auditor 214 determines to cause the neural network to misclassify synthetic images. Referring to the previous example, the performance auditor 214 may determine that the neural network is unable to successfully classify, for example, a threshold quantity (e.g., a number, a percentage, and/or the like) of synthetic images from authentic images. As such, the synthetic image generator 210 may generate additional synthetic images having changed characteristics.

Meanwhile, the training controller 212 may train the neural network with additional training data that includes the synthetic images or data with changed characteristics (e.g., generated by the synthetic image generator 210). The training controller 212 may continue to train the neural network with additional training data until the performance of the neural network (e.g., as determined by the performance auditor 214) meets a certain threshold value (e.g., fewer than x number of misclassifications per training set and/or validation set) or a loss distribution determined by the neural network satisfies a threshold value. The loss distribution may include a probability that the input image is classified as a particular class (e.g., an authentic image or a synthetic image).

In some example embodiments, the performance auditor 214 may be configured to determine the performance of a neural network (e.g., implemented by the neural network engine 140) in processing the mixed training set. For example, the performance auditor 214 may determine, based on a result of the processing of a mixed training set performed by the neural network, that the neural network misclassifies synthetic images from the mixed training set that have been subject to certain modifications. To illustrate, the performance auditor 214 may determine, based on the result of the processing of the mixed training set, that the neural network (e.g., a discriminator) misclassified, for example, a first synthetic image. The first synthetic image may be generated by at least the synthetic image generator 210 generating the first synthetic image based on a textual description of a novel class. Accordingly, the performance auditor 214 may determine that the neural network (e.g., a discriminator) may be unable to successfully classify synthetic images from non-synthetic images. The performance auditor 214 may include a discriminator model that is updated with new synthetic images or a loss distribution generated from the discriminator model to improve its ability to discriminate between synthetic and non-synthetic images or data.

In some example embodiments, the training set generator 216 may generate a mixed training set for training a neural network (e.g., implemented by the neural network engine 140). The mixed training set may include non-synthetic data, e.g., authentic images. The training set generator 216 may obtain the mixed training set from the client device 130.

Figure 3A:
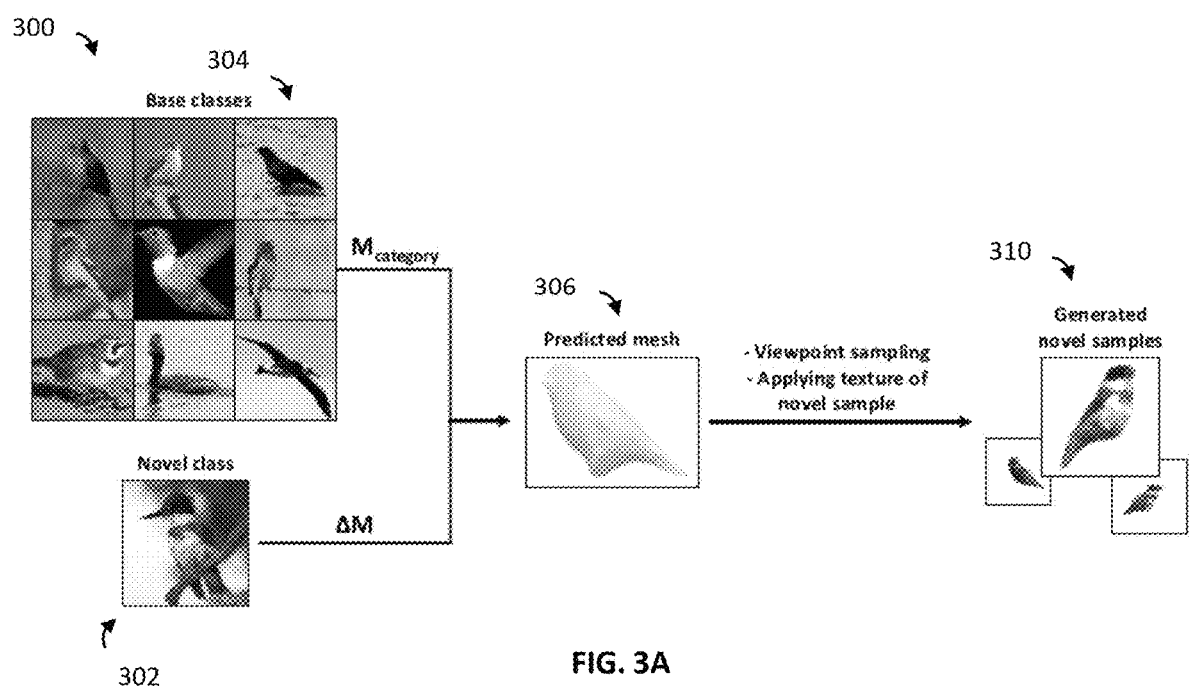
FIG. 3A a generative method for generating novel class image samples based on a predicted three dimensional mesh of a base class, in accordance with some example embodiments.

FIG. 3A depicts a generative method 300 for generating novel class image samples based on a predicted 3D mesh of a base class. As shown in the example of FIG. 3A, a novel class 302 of a bird may only include a single authentic sample for generating synthetic images of the novel class 302 (e.g., a rare bird). The method 300 may learn and generate a generic 3D mesh of a bird category from base class images 304 (e.g., base class of common birds). In some aspects, the 3D mesh may be generated based on differing viewpoints of the base class images 304. A variety of 3D imaging methods may be used to generate the 3D mesh such as, skinned multi-person linear model (SMPL), human mesh and motion recovery (HMMR), or the like.

At 306, the generic 3D mesh may be altered to fit the appearance of the novel class 302 bird (e.g., target bird). The altered 3D mesh may then be coated with the novel class 302 bird's texture and the altered 3D mesh of the novel class bird may be rotated to capture various viewpoints to generate samples 310 (e.g., two dimensional images that resemble the novel class 302 bird). With the new novel class image samples 310, a self-paced learning model may be implemented to train one or more neural networks to generate improved quality synthetic images of the novel class 302.

Figure 3B:
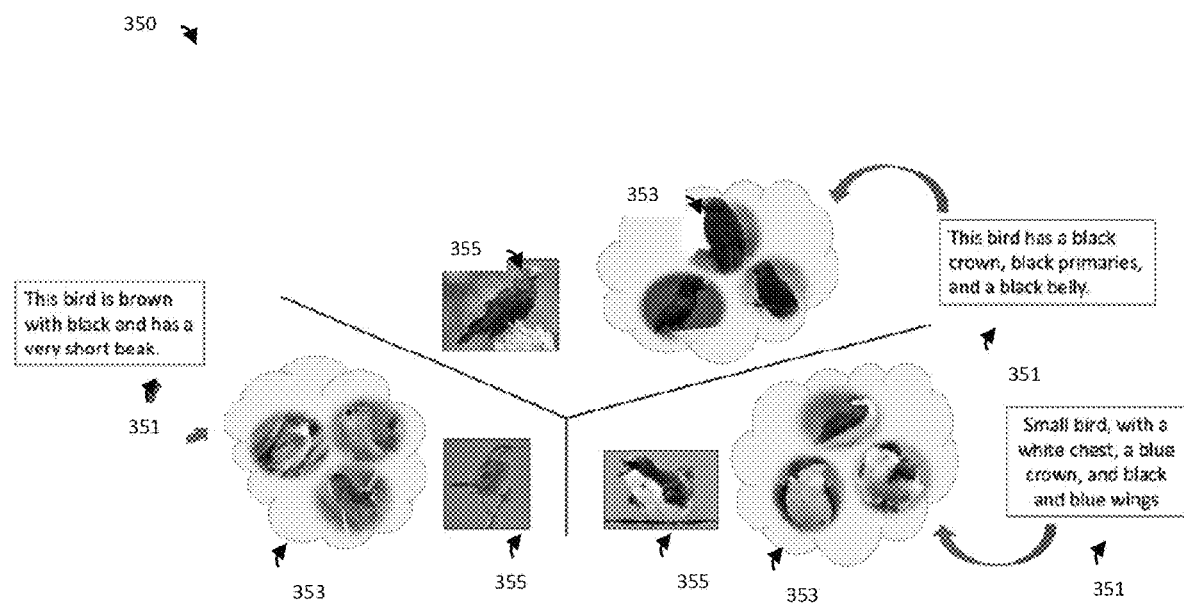
FIG. 3B depicts a generative method for generating novel class image samples based on a textual description of an object, in accordance with some example embodiments.

FIG. 3B depicts a generative method 350 for generating novel class image samples based on a textual description of an object. As shown in the example of FIG. 3B, a textual description 351 of a bird may describe characteristics of the bird for generating synthetic images 353 of the object described in the text (e.g., a bird). The method 350 may learn and generate images 353 from base class textual data 351 (e.g., base class of common birds with many samples). In some aspects, the textual data 351 of the base class images 353 may be retrieved from a database. A variety of text-to-image methods may be used to generate the images such as, generative adversarial text to image synthesis, an attention generative adversarial network, or the like.

As shown in the example of FIG. 3B, a neural network may learn to select a "high quality" image 355 from the generated images 353. The neural network (e.g., a discriminator) may select the high quality image 355 based on a score. The score may indicate a similarity of the high quality image 355 to real images of the object. A higher score may indicate a higher similarity of the generated image 355 to a real (e.g., authentic) image of the object (e.g., a novel class bird). With the high quality image samples 355, a self-paced learning model may be implemented to train one or more neural networks to generate improved quality synthetic images of a novel class described by the textual data 351.

Figure 4A:
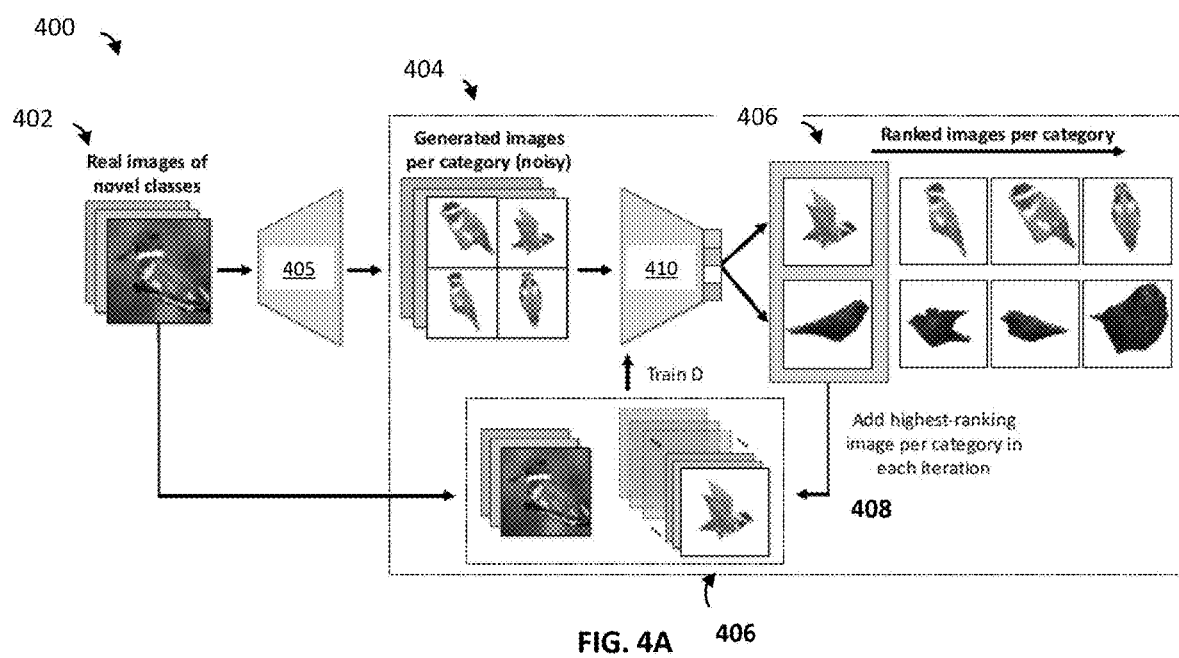
FIG. 4A depicts training an example of a generative adversarial network (GAN), in accordance with some example embodiments.

FIG. 4A depicts training an example of a self-paced generative adversarial network (GAN) 400, in accordance with some example embodiments. As shown in the example of FIG. 4A, the generative adversarial network 400 includes a generator 405 and a discriminator 410. As further shown in FIG. 4A, real (e.g., authentic) of a novel class 402 may be inputted to the generator 405. The generator 405 may be configured to generate images 404. The generated images 404 may be based on a generic 3D mesh generated from a base class (e.g., base class samples 304). The generated images 404 may then be inputted into the discriminator 410. The discriminator 410 may be configured to detect fake (e.g., synthetic) samples by, for example, determining a distribution over the state of the sample (e.g., real or fake) based on the received inputs (e.g., generated images 404). The determined distribution may be represented as a loss distribution (not shown) which may indicate whether an analyzed sample is classified as authentic or synthetic. The discriminator 410 may also be configured to rank the inputted images per category (e.g., pose, angle, or the like) with the highest ranking images 406 representing images analyzed to be closest to (e.g., most similar to or most resembles) the real (e.g., authentic) images 404. As further shown in FIG. 4A, the highest ranking images 406 may be added to the novel samples 404 and may be fed back to the discriminator 410 to update the discriminator 410 and improve its discriminatory and ranking functions. The updating the discriminator 410 may include training the discriminator 410 using a cross-entropy loss. The cross-entropy loss may be represented as a loss function indicating a difference between a probability distribution for authentic images and a probability distribution for synthetic images.

The training may further include updating the discriminator 410 with a loss distribution indicating how close the generated samples 404 resemble the real images 402. The loss distribution may include a probability that an input image (e.g., a generated sample 404) belongs to a particular classification (e.g., an authentic image classification or a synthetic image classification). The discriminator 410 may update its model based on the loss distribution to better discriminate between real (e.g., authentic) images and fake (e.g., synthetic) images. This process of generating images 404 and finding the highest ranking images 406 may be repeated multiple times to train the discriminator 410 and/or the generator 405.

In some aspects, the discriminator 410 may generate a score for the inputted images 404 indicating a closeness to the real images 402. The discriminator 410 may then rank the images 404 based on the generated score. The discriminator 410 may then output the top-ranked image 406 per category (e.g., pose, angle, or the like). The highest ranked images 406 may be fed back and inputted into the discriminator 410 to update the discriminator 410 to yield more accurate rankings as well as a higher class prediction accuracy as the quantity of novel samples increases.

Figure 4B:
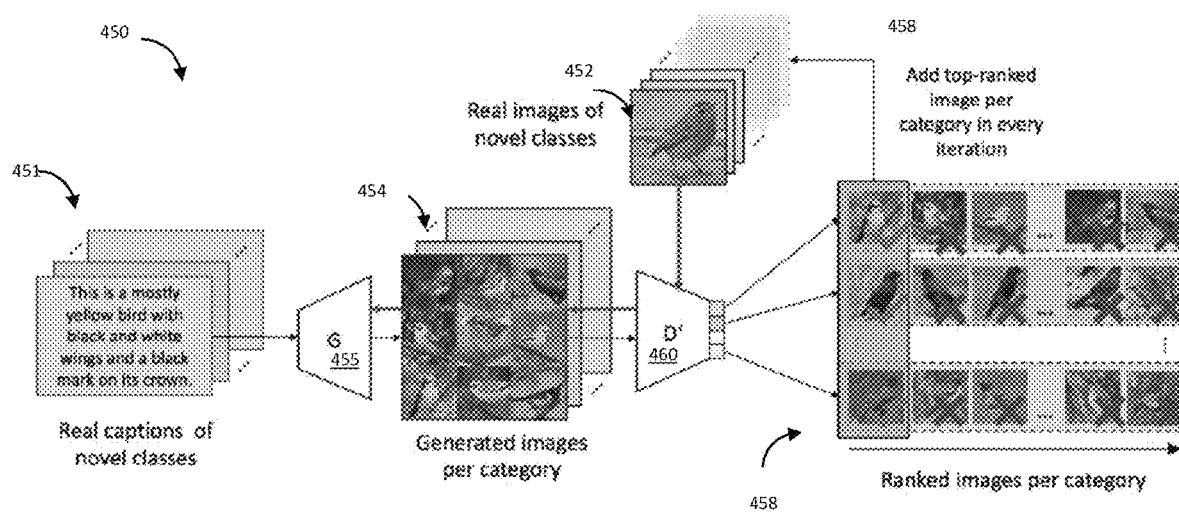
FIG. 4B depicts training another example of a generative adversarial network (GAN), in accordance with some example embodiments.

FIG. 4B depicts training an example of a self-paced generative adversarial network (GAN) 450, in accordance with some example embodiments. As shown in the example of FIG. 4B, the GAN 450 includes a generator 455 and a discriminator 460. As further shown in FIG. 4, real (e.g., authentic) textual descriptions (see, e.g., captions) of a novel class 451 may be inputted to the generator 455. The generator 405 may be configured to generate images 454. The generated images 454 may be based on the textual descriptions 451. The generated images 454 may then be inputted into the discriminator 460. The discriminator 460 may be configured to detect fake (e.g., synthetic) image samples by, for example, determining a distribution over the state of the sample (e.g., real or fake) based on the received inputs (e.g., generated images 454). The determined distribution may be represented as a loss distribution (not shown) which may indicate whether an analyzed sample is classified as authentic or synthetic.

The discriminator 460 may also be configured to rank the inputted images 454 per category (e.g., pose, angle, or the like) with the highest ranking images 458 representing images analyzed to be closest to (e.g, most similar to or most resembles) the real (e.g., authentic) images 452. As further shown in FIG. 4B, the highest ranking images 458 may be added to the novel class real image samples 452 and the combined novel class image samples 452 may be fed back to the discriminator 460 to update the discriminator 460 and improve its discriminatory and ranking functions. The novel class real image samples 452 may be retrieved from a database accessible by the system 450. The combined novel samples 452 may also be fed back to the generator 455 to update the generator 455 and improve its image generation. The updating the discriminator 460 may include training the discriminator 460 using a cross-entropy loss. The cross-entropy loss may be represented as a loss function indicating a difference between a probability distribution for authentic images and a probability distribution for synthetic images.

The training may further include updating the discriminator 460 with a loss distribution indicating how close the generated samples 454 resemble the real images 452. The loss distribution may include a probability that an input image (e.g., a generated sample 454) belongs to a particular classification (e.g., an authentic image classification or a synthetic image classification). The discriminator 460 and/or the generator 455 may update its model based on the loss distribution to better discriminate between real (e.g., authentic) images and fake (e.g., synthetic) images or generate the synthetic images 454. This process of generating images 454, finding the highest ranking images 458, and feeding back the novel class image samples 452 may be repeated multiple times to train the discriminator 460 and/or the generator 455.

In some aspects, the discriminator 460 may generate a score for the inputted images 454 indicating a closeness to the real images 452. The discriminator 460 may then rank the images 454 based on the generated score. The discriminator 460 may then output a single top-ranked image 458 per category (e.g., pose, angle, or the like). The highest ranked images 458 may be added to real images 452 of a novel class and fed back and inputted into the discriminator 460 to update the discriminator 460 to yield more accurate rankings as well as a higher class prediction accuracy as the quantity of novel samples increases.

In some embodiments, combining textual descriptions of novel class images with the three dimensional mesh of the base class may result in higher quality synthetic images or data. For example, multiple GANs may be stacked together to provide different levels of granularity. For example, a first generator 455 may receive textual descriptions 451 to generate images 454. Both the generated images 454 and the textual descriptions 451 may be input to a discriminator 460. The discriminator 460 may determine whether the generated images 454 are real or fake given the textual description. In a next stage GAN, a second generator 455 may receive the generated images 454 in conjunction with the textual descriptions 451 as input to generate a more detailed image of higher resolution. A second discriminator 460 may determine whether the more detailed image is real or fake given the textual description. Having this pipeline, the image quality may be increased at every stage of the stacked GAN.

Figure 5A:
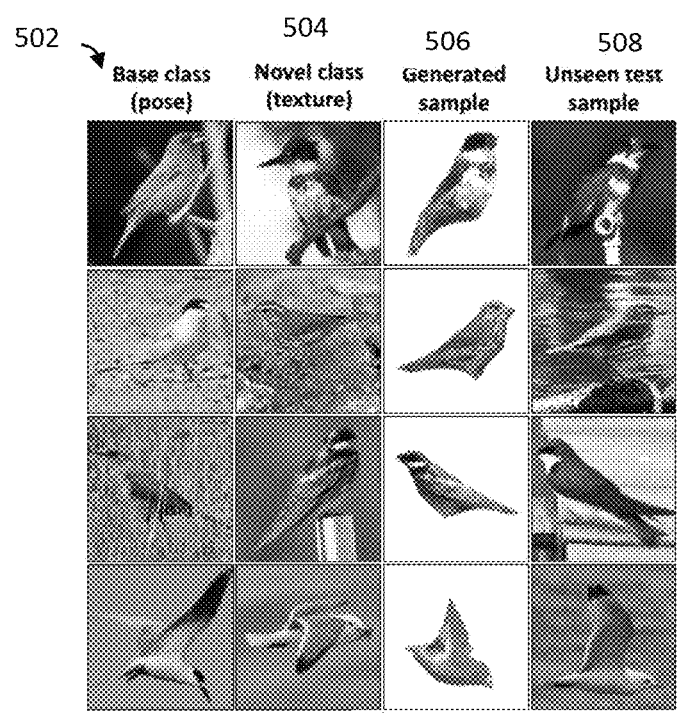
FIG. 5A depicts example outputs of a few shot learning system, in accordance with some example embodiments.

FIG. 5A depicts example outputs of a few shot learning system (e.g., system 400, 450). In the example of FIG. 5A, the first column 502 represents a base class in a specific pose (e.g., base class 304). The second column 504 represents a novel class sample (e.g., novel class 402 or 302). The third column 506 depicts generated samples that have been previously selected by the discriminator (e.g., discriminator 410, 460) with respect to the image's class-discriminatory power. The image's class discriminatory power may be based on a calculated probability that the image (e.g., generated image 506) belongs to a particular class (e.g., an authentic class of images or a synthetic class of images). The fourth column 508, depicts unseen test samples (e.g., real/authentic images not processed by the system 400, 450). As shown in FIG. 5A, a difference between the generated samples 506 in the unseen test samples 508 may be analyzed and reflect a quality of the system 400, 450 in generating quality samples 506 of the novel class 504. While images of birds are depicted in FIGS. 3-5C, the few shot learning methods described herein may apply equally to other types of images or data. For example, the few shot learning described herein may also apply to object recognition scenarios where a network (e.g., network 400) is configured to detect or recognize an object within an image based on textual descriptions, sample images, and/or other data.

Figure 5B:
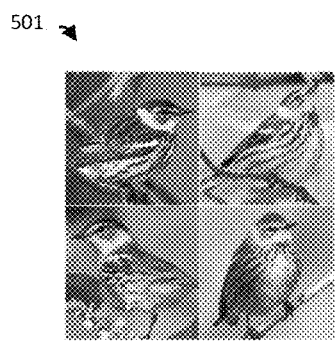
FIG. 5B depicts example real images of different poses of a novel class in a few-shot learning system, in accordance with some example embodiments.
Figure 5C:
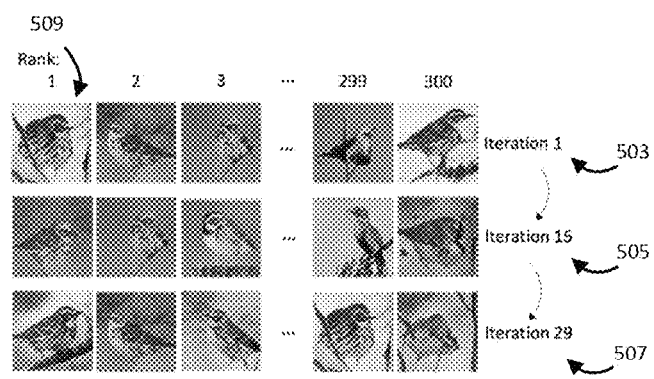
FIG. 5C depicts example outputs of a few-shot learning system iterations, in accordance with some example embodiments.

FIG. 5B depicts example real images 501 of a novel class (e.g., real images 402). FIG. 5C depicts examples of ranked images (e.g., ranked images 408, 458) generated by a generator (e.g., generator 405, 455). In the example of FIG. 5C, the first row 503 represents example ranked generated images (e.g., generated images 404, 454) after one iteration through the GAN 400, 450. The second row 505 represents example ranked generated images (e.g., generated images 404, 454) after 15 iterations through the GAN 400, 450. The third row 507 depicts example generated ranked images (e.g., ranked images 408, 458) with respect to the image's class-discriminatory power after 29 iterations through the GAN 400, 450. The image's class discriminatory power may be based on a calculated probability that the image (e.g., generated image 404, 454) belongs to a particular class (e.g., an authentic class of images or a synthetic class of images). The column 509, depicts a top ranked image (e.g., top-ranked image 408, 458) for each iteration. As shown in FIGS. 5A-5C, a difference between the top ranked images 509 may be analyzed against the real images 501, 504 and may reflect a quality of the system 400, 450 in generating quality samples 408, 458 of the novel class 406, 452. While images of birds are depicted in FIGS. 3, 4, 5A-5B, the few-shot learning methods described herein may apply to other images or data. For example, the few shot learning described herein may also apply to object recognition scenarios where a network (e.g., network 400) is configured to detect or recognize an object within an image based on textual descriptions or other images.

Figure 6:
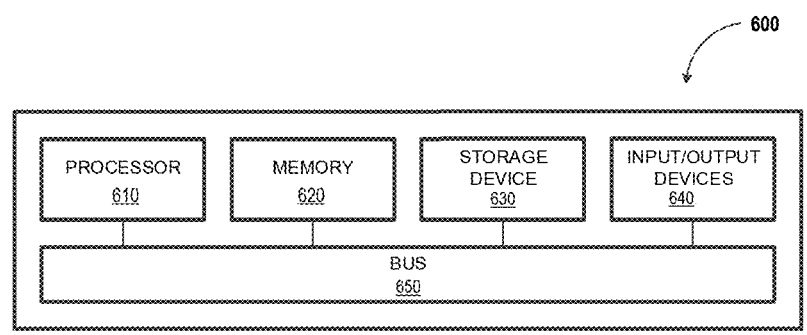
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1-5, the computing system 600 can be used to implement the training engine 110, the neural network engine 140, the client device 130, the generator 405, 455, the discriminator 410, 460, and/or any components therein.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the machine learning controller 110. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640. In some embodiments, the system 600 may include graphics processor units or other types of specialized processors for machine learning.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid state drive, a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

Figure 7:
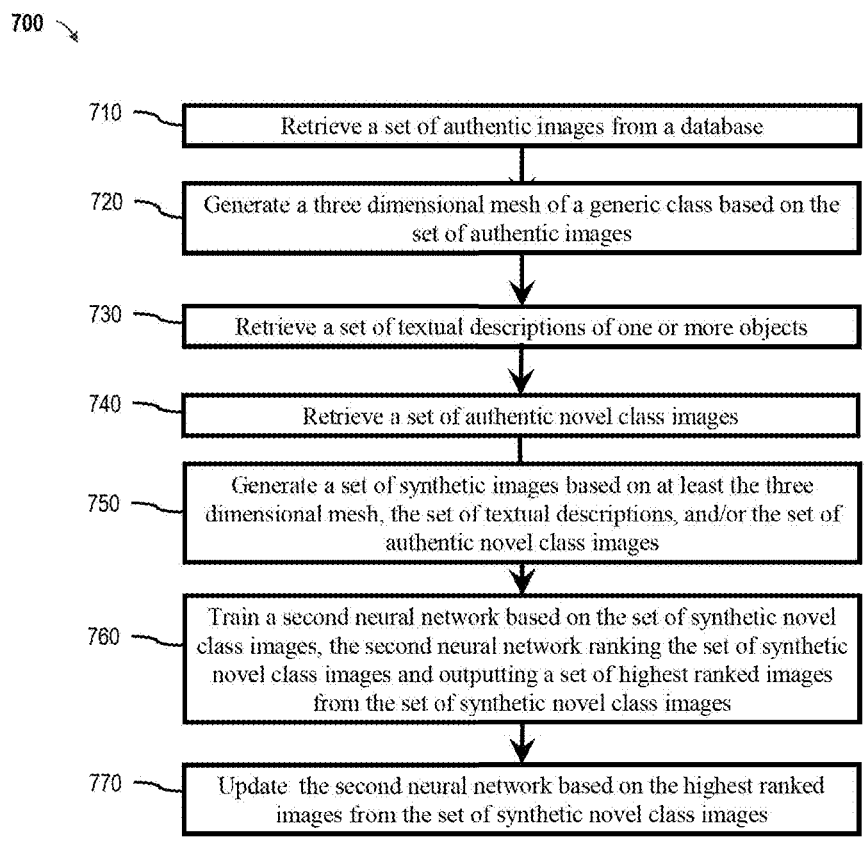
FIG. 7 depicts a flowchart illustrating an example of a process for generating synthetic images, in accordance with some example embodiments.

FIG. 7 depicts a flowchart illustrating an example of a process 700 for generating synthetic images, in accordance with some example embodiments. Referring to FIGS. 1-6, the process 700 may be performed by a computing apparatus such as, for example, the training engine 110, the neural network engine 140, the client device 130, the generator 405, 455 the discriminator 410, 460, a server, the computing system 600, and/or the like.

At operational block 710, the training engine 110 may retrieve a set of authentic images from a database (e.g., a database accessible by the training engine 110). For example, the set of authentic images may include authentic base class images (e.g., base class images 304 of FIG. 3A). Referring to FIG. 1, the training engine 110 may retrieve from the client device 130 a set of images of a base class (e.g., an object in an environment).

At operational block 720, the training engine 110 may generate a generic three dimensional mesh of the base class based on the set of authentic base class images (e.g., base class samples 304). For example, the training engine 110 may aggregate the set of authentic base class images which may include images of an object from different viewpoints and generate the three dimensional mesh of the base class or object based on the different viewpoints.

At operational block 730, the training engine 110 may retrieve a set of textual descriptions of one or more objects from a database (e.g., a database accessible by the training engine 110). For example, the set of textual descriptions may include textual descriptions (e.g., textual descriptions 351). Referring to FIG. 1, the training engine 110 may retrieve the set of textual descriptions from the client device 130. The textual descriptions may describe a base class object within an environment. The textual descriptions may include characteristics of the base class object (e.g., color, size, pose, orientation, features, or the like).

At operational block 740, the training engine 110 may retrieve a set of authentic novel class images (e.g., novel class image samples 406) from the database. Referring to FIG. 1, the training engine 110 may retrieve the set of novel class images from the client device 130. The novel class images may depict a novel class object within an environment. The novel class images may include characteristics of the novel class object and/or the environment (e.g., color, size, pose, orientation, features, or the like).

At operational block 750, the training engine 110 may generate a set of synthetic novel class images. For example and with reference to FIGS. 4A-4B, a first neural network (e.g., the generator 405, 455) may receive the authentic set of textual descriptions 451, authentic novel class images 402, and generate a set of synthetic novel class images 404, 454. The generated images 404, 454 may be based on textual descriptions of a novel class (e.g., novel class samples 451), authentic novel class images (e.g., authentic novel class images 402), and/or a three dimensional mesh (e.g., mesh 306). In some aspects, the generated images 404 may also be based on a random noise generator (not shown) inputted to the generator 405. The generator 405 may be trained on samples from the base class (e.g., base class samples 302) to generate the images 404.

At operational block 760, the training engine 110 may train a second neural network based on the set of synthetic novel class images. The second neural network (e.g., discriminator 410, 460) may rank the set of synthetic novel class images (e.g., synthetic images 404, 454). The second neural network may also output a set of highest ranked images (e.g., images 406, 458) from the set of synthetic novel class images. The second neural network may include a discriminator (e.g., discriminator 410, 460) configured to calculate a loss distribution which indicates whether an input (e.g., a generated image 404, 454) should be classified as belonging to a particular class (e.g., real/authentic or fake/synthetic). The second neural network may be trained by inputting real/authentic samples 406 to the discriminator 410 so that the discriminator 410 may learn whether past classifications or rankings were correct and may update its model based on the authentic samples 406.

At operational block 770, the training engine 110 may update the second neural network based on the highest ranked images from the set of synthetic novel class images. For example and with reference to FIGS. 4A-4B, the second neural network (e.g., the discriminator 410, 460) may output a ranking of the inputted images 404, 454 and may select the top-ranked image 406, 458 per category. The highest ranked images 406, 458 may be fed back and inputted into the discriminator 410, 460 to update the discriminator 410, 460. The highest ranked images 406, 458 may also be added to the set of authentic images 402, 452 to improve diversity of the novel class and update the generator 405, 455.

The process 700 and other embodiments described herein may also apply to other few-shot scenarios. For example, the process 700 for generating synthetic images may also apply to object recognition scenarios or other synthetic data generation. In some implementations, a few-shot network (e.g., generative adversarial networks 400, 450) may be configured to detect an object within an image. Examples of such objects may be categories of products (e.g., shoes, jewelry etc.), where visual/textual information of them may be available (e.g., in a form of catalog or manual), and a task may be to find similar product(s) on a database containing another set of images (such as web images on the Internet). In some aspects, the network (e.g., generative adversarial networks 400, 450) may be trained using a base class (e.g., catalog or manual) that includes visual and/or textual information about an object. The network (e.g., generative adversarial networks 400, 450 via discriminator 410, 460) may receive a set of novel class images (e.g., web images) and may be configured to detect whether a desired or target object is located within the novel class images based on a ranking of the inputted novel class images and/or textual descriptions of novel class objects.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   retrieving, from a database, a set of authentic base class images;
   generating, based on at least the set of authentic base class images, a three dimensional mesh of a base class;
   retrieving, from the database, a set of textual descriptions of one or more objects, the one or more objects comprising a novel class object;
   retrieving a set of authentic novel class images;
   generating, at a first neural network, a set of synthetic novel class images, the generating based on at least the three dimensional mesh, the set of textual descriptions, and the set of authentic novel class images; and
   training, based on at least the set of synthetic novel class images, a second neural network, the second neural network ranking the set of synthetic novel class images and outputting a set of highest ranked synthetic images from the set of synthetic novel class images;
   wherein training the second neural network further comprises updating the second neural network based on at least the highest ranked synthetic images from the set of synthetic novel class images.

2. The system of claim 1, wherein generating the set of synthetic novel class images is based on at least a pose of a first base class image of the set of authentic base class images, a viewpoint of the first base class image of the set of authentic base class images, a pose of a second base class image described in the set of textual descriptions, and/or a viewpoint of the second base class image described in the set of textual descriptions.

3. The system of claim 1, wherein training the second neural network further comprises training the second neural network to detect an object within the set of synthetic novel class images or the set of authentic novel class images.

4. The system of claim 3, wherein training the second neural network further comprises updating the second neural network based on at least a loss distribution, the loss distribution indicating whether the object is located within the set of synthetic novel class images or the set of authentic novel class images.

5. The system of claim 1, further comprising generating, at a third neural network, a second set of synthetic novel class images, the third neural network generated based on at least the set of synthetic novel class images and the set of textual descriptions.

6. The system of claim 5, wherein training the second neural network is further based on at least the second set of synthetic novel class images.

7. The system of claim 5, wherein the second neural network is configured to rank the second set of synthetic novel class images and output a set of highest ranked synthetic images from the second set of synthetic novel class images, and wherein training the second neural network further comprises updating the second neural network based on at least a loss distribution, the loss distribution indicating whether the set of highest ranked synthetic images are classified as authentic or synthetic.

8. The system of claim 1, further comprising adding the set of highest ranked synthetic images to the set of authentic novel class images, wherein generating the set of synthetic novel class images is further based on at least the set of highest ranked synthetic images.

9. The system of claim 8, further comprising training the first neural network based on at least the set of highest ranked images.

10. The system of claim 1, wherein training the second neural network further comprises updating the second neural network based on at least a loss distribution, the loss distribution indicating whether the synthetic novel class images are classified as authentic or synthetic.

11. The system of claim 1, wherein the base class images comprises a set of images including a plurality of samples, and wherein the novel class images comprises a set of images having fewer samples than the base class images.

12. The system of claim 1, wherein generating the set of synthetic novel class images comprises altering the three dimensional mesh based on at least an authentic novel class image of the set of authentic novel class images.

13. The system of claim 12, wherein altering the three dimensional mesh comprises rotating the three dimensional mesh to capture one or more viewpoints of the authentic novel class image.

14. The system of claim 12, wherein altering the three dimensional mesh comprises adding a texture of the authentic novel class image to the three dimensional mesh.

15. The system of claim 1, wherein ranking the set of synthetic novel class images comprises scoring the set of synthetic novel class images per category based on at least a similarity to the set of authentic novel class images.

16. The system of claim 15, wherein outputting the set of highest ranked synthetic images comprises outputting an image with the highest score per category.

17. A computer-implemented method, comprising:
retrieving, from a database, a set of authentic base class images;
generating, based on at least the set of authentic base class images, a three dimensional mesh of a base class;
retrieving, from the database, a set of textual descriptions of one or more objects, the one or more objects comprising a novel class object;
retrieving a set of authentic novel class images;
generating, at a first neural network, a set of synthetic novel class images, the generating based at least on the three dimensional mesh, the set of textual descriptions, and the set of authentic novel class images; and
training, based on at least the set of synthetic novel class images, a second neural network, the second neural network ranking the set of synthetic novel class images and outputting a set of highest ranked synthetic images from the set of synthetic novel class images;
wherein training the second neural network further comprises updating the second neural network based on at least the highest ranked synthetic images from the set of synthetic novel class images.

18. The method of claim 17, further comprising:
adding the set of highest ranked synthetic images to the set of authentic novel class images, wherein generating the set of synthetic novel class images is further based on at least the set of highest ranked synthetic images.

19. The method of claim 17, further comprising training the first neural network based on at least the set of highest ranked synthetic images.

20. A non-transitory computer readable medium storing instructions, which when executed by at least one data processor, result in operations comprising:
retrieving, from a database, a set of authentic base class images;
generating, based on at least the set of authentic base class images, a three dimensional mesh of a base class;
retrieving, from the database, a set of textual descriptions of one or more objects, the one or more objects comprising a novel class object;
retrieving a set of authentic novel class images;
generating, at a first neural network, a set of synthetic novel class images, the generating based at least on the three dimensional mesh, the set of textual descriptions, and the set of authentic novel class images; and
training, based on at least the set of synthetic novel class images, a second neural network, the second neural network ranking the set of synthetic novel class images and outputting a set of highest ranked synthetic images from the set of synthetic novel class images;
wherein training the second neural network further comprises updating the second neural network based on at least the highest ranked synthetic images from the set of synthetic novel class images.

\* \* \* \* \*